US012637298B2

(12) United States Patent
Schohaus et al.

(10) Patent No.: US 12,637,298 B2
(45) Date of Patent: May 26, 2026

(54) PACKAGING LINE OF A PACKAGING INSTALLATION AND METHOD FOR OPERATING SUCH A PACKAGING LINE

(71) Applicant: ILLINOIS TOOL WORKS INC., Glenview, IL (US)

(72) Inventors: Hermann Schohaus, Berge (DE); Theo Schulte, Fürstenau (DE); Linus Wöhle, Schapen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 710 days.

(21) Appl. No.: 18/014,454

(22) PCT Filed: Jul. 8, 2021

(86) PCT No.: PCT/IB2021/000666
§ 371 (c)(1),
(2) Date: Jan. 4, 2023

(87) PCT Pub. No.: WO2022/013616
PCT Pub. Date: Jan. 20, 2022

(65) Prior Publication Data
US 2023/0249919 A1 Aug. 10, 2023

(30) Foreign Application Priority Data

Jul. 8, 2020 (EP) ..................................... 20184794
Oct. 13, 2020 (EP) ..................................... 20201478

(51) Int. Cl.
B65G 43/10 (2006.01)
(52) U.S. Cl.
CPC .................................... B65G 43/10 (2013.01)
(58) Field of Classification Search
CPC ....................................................... B65G 43/10
See application file for complete search history.

(56) References Cited

U.S. PATENT DOCUMENTS 5,341,915 A * 8/1994 Cordia .................. B65G 43/10
198/460.1
6,523,328 B1 * 2/2003 De Cardenas ........ B65B 61/205
53/399

(Continued)

FOREIGN PATENT DOCUMENTS

CN 103946113 A 7/2014
CN 105636869 A 6/2016

(Continued)

OTHER PUBLICATIONS

EPO (Riswijk, NL), English language version of the International Search Report, Form PCT/ISA/210, for International Application PCT/IB2021/000666, Dec. 23, 2021 (2 pages).

(Continued)

*Primary Examiner* — Kyle O Logan
(74) *Attorney, Agent, or Firm* — Pauley Erickson & Swanson

(57) ABSTRACT

A method for operating a packaging line of a packaging installation, wherein the packaging line includes at least one packaging machine having an infeed conveyor belt, wherein the packaging line further includes at least one transport belt which is disposed upstream of the infeed conveyor belt, wherein the method includes the steps of: i) defining and/or determining a current machine performance of the at least one packaging machine; ii) determining an output request for the at least one transport belt; and iii) defining and setting a transport speed of the at least one transport belt, wherein the transport speed is defined as a function of the determined output request.

8 Claims, 2 Drawing Sheets

(56) References Cited

U.S. PATENT DOCUMENTS

| | | | | |
|---|---|---|---|---|
| 7,894,934 | B2 * | 2/2011 | Wallace ................ | B65G 43/00 |
| | | | | 198/341.01 |
| 8,408,380 | B2 * | 4/2013 | Doane ................... | B65G 43/08 |
| | | | | 198/460.1 |
| 2001/0007204 | A1 | 7/2001 | Glosmann | |
| 2012/0004766 | A1 | 1/2012 | Stoll et al. | |
| 2018/0134433 | A1 * | 5/2018 | Dörenberg ............. | B65B 35/44 |

FOREIGN PATENT DOCUMENTS

| | | | |
|---|---|---|---|
| CN | 107810146 | A | 3/2018 |
| DE | 10 2015 110 390 | A1 | 12/2016 |
| EP | 1 863 169 | A2 | 12/2007 |
| EP | 2 075 660 | A1 | 7/2009 |
| EP | 3 313 737 | B1 | 12/2018 |
| WO | WO2008/022943 | A1 | 2/2008 |

OTHER PUBLICATIONS

EPO (Riswijk, NL), English copy of the Written Opinion of the Int'l Searching Authority, Form PCT/ISA/237, for Int'l Application PCT/IB2021/000666, Dec. 23, 2021 (8 pages).

* cited by examiner

Light barriers at the beginning of the belt

Light barriers at the end of the belt

PACKAGING LINE OF A PACKAGING INSTALLATION AND METHOD FOR OPERATING SUCH A PACKAGING LINE

CROSS REFERENCE TO RELATED APPLICATION

This application is National Phase filing in the United States, under 35 USC § 371, of PCT International Patent Application PCT/IB2021/000666, filed on 8 Jul. 2021, which claims the priority of European Patent Applications EP 20184794.4, filed 8 Jul. 2020 and EP 20201478.3, filed 13 Oct. 2020.

BACKGROUND OF THE INVENTION

These applications are hereby incorporated by reference herein in their entirety and is made a part hereof, including but not limited to those portions which specifically appear hereinafter.

FIELD OF THE INVENTION

The present invention relates generally to packaging lines of a packaging installation and to methods for operating such packaging lines.

The term "packaging line" as used here generally refers to packaging machines which are connected in series and work together. The packaging machines perform tasks such as carton folding and carton unfolding, carton filling and finishing.

DISCUSSION OF RELATED ART

Packaging lines of the type considered here therefore typically comprise different packaging units or packaging machines, such as for further processing already filled packs (generally also referred to here as "products"), for example by assembling the filled packs/products into units or providing straw, labels, or the like.

Since the individual packaging machines within a packaging line are typically disposed sequentially one behind the other and the individual processing steps typically differ in terms of their processing time, coordination of the processing steps of the individual packaging machines among one another is essential for a smooth flow of a packaging process. For uninterrupted operation, it is in particular necessary to prevent products/packs from backing up on the individual transport or conveyor belts of the packaging line, because, especially in the case of soft packaging, this can lead to damage to the packs/products.

However, in order to ensure that a packaging process runs completely smoothly and without damaging the packaging, it is not only necessary for the workflows of the packaging machines to be appropriately aligned with one another, but also for the process within the individual packaging machines to be coordinated appropriately.

A packaging line or packaging installation of the previously described type, which enables gentle and at the same time precise and flexible packing of filled packs, is known from the document EP 3 313 737 B1 (SIG Technology AG).

For this purpose, the document EP 3 313 737 B1 proposes a packaging installation which comprises at least two packaging devices or packaging machines, wherein each packaging device/packaging machine comprises an infeed belt and an outfeed belt, and wherein the infeed belt of the packaging device/packaging installation delivers packs or products and the outfeed belt receives products processed by the packaging installation. A transport belt is disposed between the outfeed belt of a first packaging installation and the infeed belt of a second packaging installation.

To enable gentle and at the same time precise and flexible packing of filled packs/products, the document EP 3 313 737 B1 in particular proposes providing a central control system, which determines the actual speed of the infeed belts and the outfeed belts of the packaging machines and also the transport belt, and which further determines the actual packing density of the infeed belts and the outfeed belts of the packaging machines and also the transport belt, wherein the central control system determines the target speeds for the infeed belts and the outfeed belts of the packaging machines and also the transport belt as a function of the actual packing density and the actual speeds.

Even though coordination of the individual packaging machines is possible with the aid of the central control system proposed in the document EP 3 313 737 B1, the solution known from this state of the art nonetheless has certain disadvantages. In particular, the packaging installation or packaging line known from this state of the art cannot be adapted particularly quickly, or only with a deal of effort, to changes that may occur in the work process. Moreover, because of the central control system, a relatively complex communication network between the individual devices of the packaging line is needed.

On the other hand, a packaging system, in particular for packaging foodstuffs, is known from the document EP 2 075 660 A1 (TETRA LAVAL Holdings & Finance S.A.). The packaging system known from this state of the art has a packaging line comprising a plurality of packaging stations/packaging machines, such as a filling unit, a straw applicator unit, a cartoning unit, and the like.

In addition, a packaging line monitoring system is used, which serves to control the packaging installation centrally and in as stable a manner as possible, whereby the packaging installation should furthermore be flexibly configurable without the need for specific software for operating the packaging installation.

The packaging system known from this state of the art has the same disadvantages as have already been described in connection with EP 3 313 737 B1.

EP 2 075 660 A1 also did not take into account the problem of damage to individual products/packs, in particular due to poor coordination of individual packaging machines.

SUMMARY OF THE INVENTION

The underlying object of the present invention is therefore to provide a packaging line of a packaging installation and a corresponding method for operating such a packaging line, which enables gentle packing of products, for example filled packs, with as little effort as possible, whereby the packaging line should further be quickly adaptable to changes that can occur in the work process. The intent in particular is to minimize the wasting of resources, increase the productivity of the packaging line and improve the overall flow efficiency.

Accordingly, the present invention relates in particular to a packaging line of a packaging installation, wherein the packaging line comprises at least one packaging machine having an infeed conveyor belt, wherein the packaging line further comprises at least one transport belt which, viewed in the transport direction of the packaging line, is disposed upstream of the infeed conveyor belt of the at least one packaging machine and in series with the infeed conveyor belt of the at least one packaging machine.

According to a further aspect, the present invention relates in particular to a packaging line of a packaging installation, wherein the packaging line comprises at least two packaging machines, which are connected in series and work together and each comprise an infeed conveyor belt and an outfeed conveyor belt, wherein the packaging line further comprises at least one transport belt which is disposed between the outfeed conveyor belt of a, viewed in the transport direction of the packaging line, upstream packaging machine and the infeed conveyor belt of a, viewed in the transport direction of the packaging line, downstream packaging machine in series with the packaging machines.

Such packaging lines are in particular characterized by a plurality of packaging machines (packaging stations/packaging devices) that further process the packs or products in respective different work steps. In filling systems for beverage cartons, for example, first a straw applicator and then a shrink film applicator are used after a filling machine. In the shrink film applicator, multiple packs/products are combined into one pack.

When designing a packaging line or a packaging installation, the focus is increasingly on the processing rate, i.e., the number of packs or products per unit of time. The higher the processing rate of a packaging line, the more efficiently the packaging line worked.

There is therefore a fundamental need to optimize the processing rate of a single packaging machine of the packaging line in order to increase the processing rate of the entire packaging line. When operating a packaging line, the goal is to operate the respective slowest packaging machine at its maximum processing rate as much as possible in order to maximize the throughput of products of the packaging line as much as possible.

On the other hand, in the operation of a packaging line, it is generally also unavoidable for disruptions to occur when processing the products on individual packaging machines. In order to be able to maintain an ideally uninterrupted production process and/or to compensate for fluctuations in the processing rate of packaging machines of the packaging line, it is common practice for a storage device, for example in the form of a storage table or in the form of an (additional) transport belt, to be disposed between two packaging machines, whereby, in the case of an (additional) transport belt, the corresponding filling rate of the (additional) transport belt is variably adjustable, so that this (additional) transport belt can serve as a buffer storage.

The (additional) transport belt picks up packs if a disruption occurs downstream of the transport belt in the packaging line and the products/packs can no longer be processed further downstream. Once the downstream disruption has been rectified, the products temporarily stored on the (additional) transport belt can be retrieved from the (additional) transport belt and processed further.

The (additional) transport belt thus makes it possible to continue operating the with respect to the transport belt upstream packaging machines or other machines for a certain period of time, at least until the filling rate of the additional transport belt is filled, i.e., the acceptance capacity of the additional transport belt is exhausted.

In order to improve flow efficiency of the packaging line according to the invention, and in particular to quickly adapt the packaging line to changes that may occur in the work process, according to the invention it is in particular proposed that the packaging line comprises a belt control system (line controller) which is in particular constructed according to the principle of a pull system and is configured to communicate output requests and/or information or line-relevant data of the packaging line from the infeed conveyor belt of the downstream packaging machine to the at least one transport belt and from the at least one transport belt to the outfeed conveyor belt of the upstream packaging machine against the transport direction of the packaging line, in particular as needed.

The communication with the aid of the decentralized belt control system, which is in particular constructed according to the principle of a pull system, preferably runs via a suitable bus system, in particular a Profibus system.

Providing such a decentrally active belt control system, which is configured to communicate output requests and/or information against the transport direction of the packaging line as needed, makes it possible to implement a lean packaging principle that creates a workflow in which the individual transport and/or conveyor belts of the packaging line are only activated if there is actual need. The implementation of the belt control system according to the invention serves in particular to activate the products of upstream packaging machines or components of the packaging installation based on a real demand from a downstream packaging installation.

Each packaging machine or each transport belt of the packaging line is thus focused on one component of the packaging line that, viewed in the transport direction of the packaging line, is immediately downstream. This approach allows a component of the packaging line to quickly adapt to changes that may occur in the work process, minimize the wasting of resources, increase productivity, and improve the flow efficiency as a whole.

With respect to the operating method according to the invention of the packaging line of a packaging installation, it is in particular provided that a current machine performance of the downstream packaging machine of the packaging line is defined and/or determined, whereby the current machine performance defines the number of products to be processed by the downstream packaging machine per unit of time.

In the operating method according to the invention, it is further provided that an output request for the at least one transport belt of the packaging line, which is disposed in series with the packaging machines of the packaging line, is determined. The output request for the at least one transport belt defines a number of products to be delivered to the infeed conveyor belt of the, viewed in the transport direction of the packaging line, downstream packaging machine by means of the at least one transport belt per unit time.

The operating method according to the invention is in particular also characterized in that a transport speed of the at least one transport belt is preferably defined and set automatically, whereby the transport speed is defined as a function of the determined output request.

According to implementations of the method according to the invention, it is provided that the method further comprises the method step of determining a current fill level of the infeed conveyor belt of the at least one packaging machine, whereby the transport speed of the at least one transport belt is defined as a function of the determined fill level of the infeed conveyor belt.

With respect to the transport speed of the at least one transport belt, it is in particular provided that said speed is calculated according to the following formula:

5

$$V = R_{ne} \cdot \frac{l}{Fl_{next}}$$

with:

V=transport speed $R_{ne}$=output request from the infeed conveyor belt of the at least one packaging machine $Fl_{next}$=fill level of the infeed conveyor belt of the at least one packaging machine with $0 \leq Fl_{next} \leq 1$ l=product length The transport speed of the at least one transport belt is in particular defined such that, when products are transferred from the at least one transport belt to the infeed conveyor belt of the at least one packaging machine, pushing of the products on the infeed conveyor belt is prevented.

With respect to the method according to the invention, it is in principle conceivable that the defined and/or determined current machine performance of the downstream packaging machine and a current fill level of the infeed conveyor belt of the downstream packaging machine are taken into consideration when determining the output request for the at least one transport belt of the packaging line.

The current machine performance of the packaging machine defines the number of products processed by the packaging machine per unit of time. The current machine performance is typically less than the so-called possible machine performance of the packaging machine, whereby the possible machine performance of the packaging machine is the number of products theoretically processed by the packaging machine per unit of time.

The current machine performance of the packaging machine in the packaging line is calculated/defined as a function of the possible machine performance of all of the packaging machines in the packaging line and as a function of a current possible output of transport belts between the packaging machines. For this purpose, the possible machine performances of all of the packaging machines of the packaging line are queried and the current machine performance of the packaging machines is then set to the smallest queried value of the possible machine performances.

The current machine performance defined by the belt control system serves in particular as an output target for all of the packaging machines of the packaging line, whereby the downstream packaging machine of the packaging line is in particular configured to request a calculated output from the at least one upstream transport belt on the basis of the output target. This output request for the upstream transport belt consists of the output target of the more downstream packaging machine and a fill level of the infeed conveyor belt of the packaging machine.

The output request for the at least one transport belt is in particular determined such that the number of products to be delivered to the infeed conveyor belt of the downstream packaging machine per unit of time by means of the at least one transport belt corresponds to the number of products to be delivered per unit of time which are to be processed by the downstream packaging machine in accordance with the current machine performance and which is necessary to achieve a previously defined or definable fill level of the infeed conveyor belt of the downstream packaging machine.

According to further developments of the operating method according to the invention, this includes the method step of determining an output request for the outfeed conveyor belt of the upstream packaging machine, whereby the output request defines a number of products to be delivered to the at least one transport belt per unit of time by means of the outfeed conveyor belt of the upstream packaging machine.

In particular the defined and/or determined current machine performance of the downstream packaging machine, a current fill level of the infeed conveyor belt of the downstream packaging machine, and a current fill level of the at least one transport belt, are taken into consideration when determining the output request for the outfeed conveyor belt of the upstream packaging machine.

In this context it is in particular conceivable that the output request for the outfeed conveyor belt of the upstream packaging machine is determined such that the number of products to be delivered to the at least one transport belt per unit of time by means of the outfeed conveyor belt of the upstream packaging machine corresponds to the number of products to be delivered per unit of time which are to be processed by the downstream packaging machine in accordance with the current machine performance and which is necessary to achieve a previously defined or definable fill level of the infeed conveyor belt of the downstream packaging machine and a previously defined or definable fill level of the at least one transport belt.

According to embodiments of the method according to the invention, it is provided that the method further comprises the method step of respectively determining a current fill level of the outfeed conveyor belt of the upstream packaging machine, a current fill level of the at least one transport belt and a current fill level of the infeed conveyor belt of the downstream packaging machine.

According to preferred implementations of the solution according to the invention, it is provided that a transport speed of at least the at least one transport belt in particular immediately upstream of the infeed conveyor belt of the downstream packaging machine is set when products are to be delivered from the at least one transport belt to the infeed conveyor belt of the downstream packaging machine or another immediately downstream transport belt, whereby the transport speed is calculated as a function of the fill level of the infeed conveyor belt of the downstream packaging machine or as a function of the fill level of the immediately downstream transport speed belt.

The transport speed of the transport belt is preferably calculated according to the following formula:

$$V = R_{ne} \cdot \frac{l}{Fl_{next}}$$

with:

V=transport speed $R_{ne}$=output request from the downstream transport or conveyor belt $Fl_{next}$=fill level of the downstream transport or conveyor belt l=product length With respect to the packaging line according to the invention, the already mentioned belt control system is provided for implementing the operating method according to the invention. The belt control system is in particular constructed according to the principle of a pull system and is configured to communicate output requests and/or information or line-relevant data from the infeed conveyor belt of the downstream packaging machine to the at least one transport belt and from the at least one transport belt to the outfeed conveyor belt of the upstream packaging machine against the transport direction of the packaging line, in particular as needed, preferably via a bus system, in particular a Profibus system.

According to implementations of the belt control system, the belt control system is configured to issue a first output request from the downstream packaging machine to the infeed conveyor belt assigned to the downstream packaging machine, whereby the first output request defines a number of products to be delivered to the downstream packaging machine by means of the infeed conveyor belt per unit of time.

The belt control system is preferably further configured to issue a second output request from the infeed conveyor belt of the downstream packaging machine to the transport belt immediately upstream of the infeed conveyor belt, whereby the second output request defines a number of products to be delivered to the infeed conveyor belt of the downstream packaging machine by means of the immediately upstream transport belt per unit of time.

The belt control system is in particular further configured to issue a third output request from the transport belt immediately upstream of the infeed conveyor belt to a further transport belt immediately upstream of the transport belt or to the outfeed conveyor belt of the upstream packaging machine, whereby the third output request defines a number of products to be delivered to the transport belt immediately upstream of the infeed conveyor belt by means of the further transport belt or by means of the outfeed conveyor belt of the upstream packaging machine per unit of time.

The first output request is preferably determined by a current machine performance of the downstream packaging machine, whereby, as already mentioned, the current machine performance defines the number of products to be processed by the downstream packaging machine per unit of time.

The second output request is preferably determined by a current machine performance of the downstream packaging machine and by a current fill level of the infeed conveyor belt assigned to the downstream packaging machine.

The third output request is preferably determined by a current machine performance of the downstream packaging machine, by a current fill level of the infeed conveyor belt assigned to the downstream packaging machine and by a current fill level of the transport belt immediately upstream of the infeed conveyor belt.

According to implementations of the packaging line according to the invention, it is provided that the infeed conveyor belt of the upstream packaging machine, the at least one transport belt and the infeed conveyor belt of the downstream packaging machine are each associated with a system for detecting a current fill level of the respective conveyor belt or transport belts.

The belt control system is preferably configured to set a transport speed of the at least one transport belt as a function of the current fill level of a transport or conveyor belt, viewed in the transport direction of the packaging line, immediately downstream of the at least one transport belt. The downstream transport or conveyor belt is in particular the infeed conveyor belt of the downstream packaging machine. The current fill level of the downstream transport or conveyor belt is in particular the current level of filling of the downstream transport or conveyor belt at the time of an output request from the downstream transport or conveyor belt.

The systems for detecting a current fill level of the corresponding conveyor belt or transport belt can respectively comprise a light barrier system having a light barrier at the beginning of the belt and a light barrier at the end of the belt. The light barriers at the respective beginnings of the belts are preferably mounted and/or configured such that, when occupied by a product, they are released again when the corresponding conveyor or transport belt is in motion. The light barriers at the respective ends of the belts, on the other hand, are preferably mounted and/or configured such that, when occupied by a product, they are not released again when a corresponding downstream conveyor or transport belt is in motion.

According to preferred embodiments, the belt control system is configured to also set the transport speed of the at least one transport belt as a function of an output request from the transport and/or conveyor belt, viewed in the transport direction of the packaging line, immediately downstream of the at least one transport belt, whereby the transport speed is in particular the higher the greater the number of products to be delivered per unit of time defined by the output request and the smaller the fill level of the transport or conveyor belt, viewed in the transport direction of the packaging line, immediately downstream of the at least one transport belt.

According to embodiments of the packaging line according to the invention, a plurality of transport belts which work together are disposed in series between the at least two packaging machines which are connected in series and work together.

The functional principle of the packaging line according to the invention and the method according to the invention for operating a packaging line are described in more detail in the following with reference to the accompanying drawings and on the basis of schematic design examples.

DETAILED DESCRIPTION OF THE INVENTION

A packaging line of the type considered here comprises packaging machines which are connected in series and work together. They perform tasks such as carton folding and carton unfolding, carton filling and finishing. Packaging lines can be expanded in a modular manner, for example with a case packer.

Figure 1:
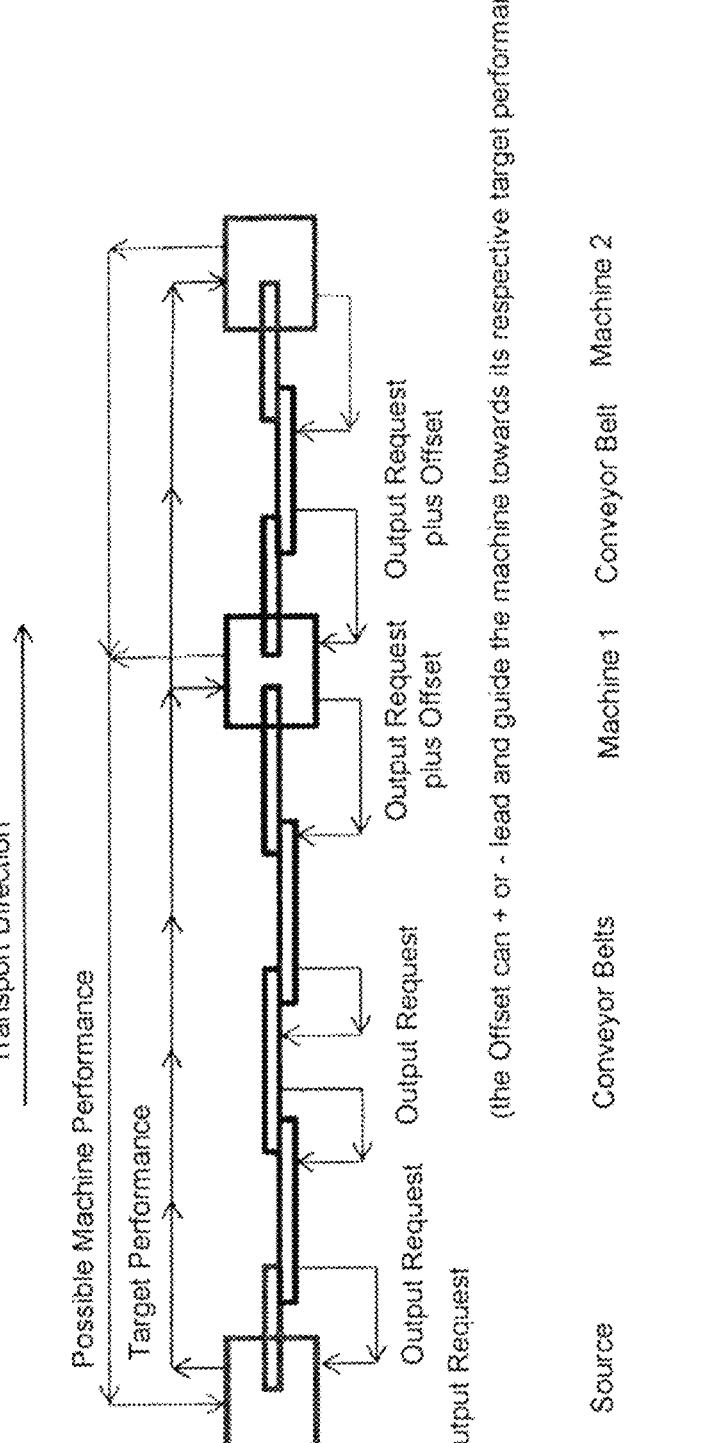
FIG. 1 shows schematically, an example embodiment of the packaging line according to the invention in an overall view.

In the packaging line shown schematically in FIG. 1, for example, different packaging devices or packaging machines are provided one after the other (downstream), which in particular have different nominal outputs and set outputs. The nominal output determines the number of products/packs per unit of time that can be output by the respective packaging machine and can also be referred to as the nominal capacity. The set output determines the actual number of packs/products output per unit of time and can also be referred to as the current capacity. The number of packs/products that a packaging machine can accommodate per unit of time can also be referred to as the intake capacity. This is typically identical to the set output, in particular when the number of products introduced in the packaging machine is equal to the number of products output, which is the rule.

Since the packaging machines disposed one after the other in the packaging line in particular have different nominal outputs and set outputs, the intake capacity of the different packaging machines is usually also different.

As shown schematically in FIG. 1, a conveyor or transport belt, which is in particular part of the respective packaging machine, is provided before and after (i.e., viewed in the transport direction of the packaging line, upstream and downstream) of each individual packaging machine. An infeed conveyor belt is provided at the entrance of each packaging machine and an outfeed conveyor belt is provided at the exit of the packaging machine.

Since the packaging machines are disposed sequentially one behind the other in the packaging line, uninterrupted operation is necessary to prevent products from backing up on the respective transport or conveyor belts.

Product accumulation at the entrance of a packaging machine can be prevented by providing a clamp or a stopper in the region of the infeed conveyor belt that prevents further transport of products to the entrance of the packaging machine. Subsequent products then run onto the products stopped by the stopper and pile up. However, this procedure is problematic for soft packaging, because the products can be damaged when they come into contact with one another.

A belt control system (line controller) is therefore provided in the solution according to the invention shown in the drawings, which takes on the central management of the line-relevant data of the individual packaging machines and the other components of the packaging line, such as in particular the transport or conveyor belts in the packaging line. The essential control function of the belt control system is that each individual packaging machine and each individual transport or conveyor belt of the packaging line sends its possible output to the belt control system.

The belt control system in turn limits the output of all of the packaging machines in the packaging line to the slowest reported machine performance and the current possible output of the at least one transport belt provided between the packaging machines and serving as "storage". This results in an output target for all of the packaging machines. Based on this output target, each packaging machine requests a calculated output from the feeding transport or conveyor belt.

In FIG. 1, the respective output requests from the components of the packaging line against the transport direction of the packaging line are indicated by the reference sign L and the corresponding arrows.

The output request for the transport or conveyor belts is based on the output request of the following belt and the current fill level of the own transport belt.

Figure 3:
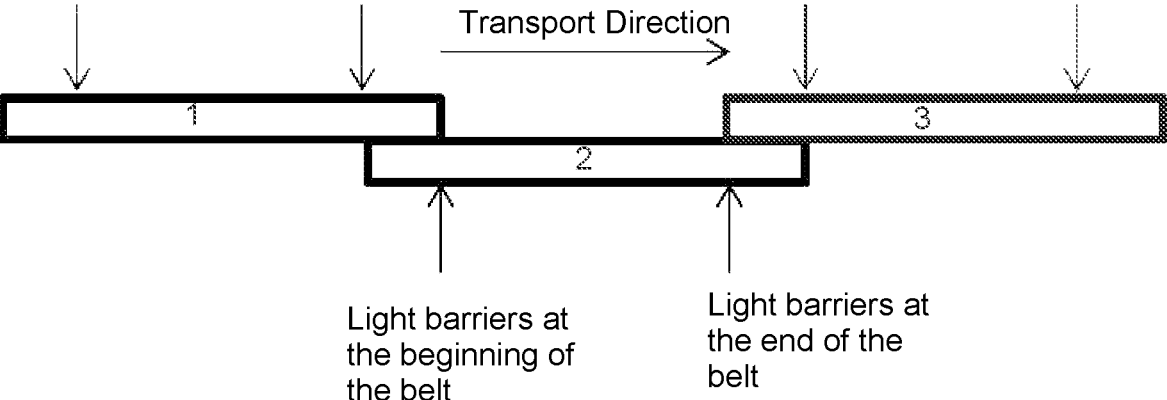
FIG. 3 shows schematically, three transport belts, which are connected in series and work together, of an example embodiment of the packaging line according to the invention to illustrate the detection of the fill level.

FIG. 3 schematically shows a corresponding fill level determination for the transport or conveyor belts of a packaging line. In the design example shown schematically in FIG. 3, the fill level determination for each transport or conveyor belt is carried out by means of two light barriers.

More specifically, as indicated schematically in FIG. 3, a first light barrier is provided at the beginning of the belt of the respective transport or conveyor belt and a further light barrier is provided at the end of the belt of the respective transport or conveyor belt.

The light barrier at the beginning of the belt is preferably mounted such that, when occupied by a product, said light barrier is released again when the corresponding transport or conveyor belt is in motion and the, viewed in the transport direction of the packaging line, upstream transport or conveyor belt is stationary or is moving more slowly. The light barrier at the end of the belt, on the other hand, is preferably mounted such that, when occupied by a product, said light barrier is not released again when the downstream transport belt is in motion.

In the example embodiment of the packaging line shown in the drawings, it is accordingly provided that each transport or conveyor belt determines the current fill level for itself. This is in particular calculated with the aid of the light barrier at the beginning of the belt, the transport belt speed and the transport belt length. The target fill level is an adjustable variable and can be set by an operator of the packaging line via an interface (for example on the panel).

The belt control system is constructed according to the principle of a pull system. This results in a flow of information against the transport direction of the packaging line. Consequently, an output request (number of products per unit time) always has to be submitted by a following belt or even a packaging machine. Conversely, this output request also has to be passed on to the upstream belt.

Figure 2:
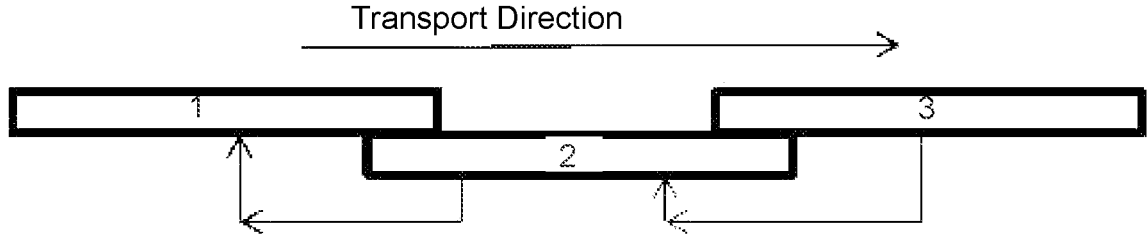
FIG. 2 shows schematically, three transport belts, which are connected in series and work together, of an example embodiment of the packaging line according to the invention.

If, for example, in the system shown schematically in FIG. 2, the downstream belt requests 120 products per minute and the current fill level of the downstream belt corresponds to the previously defined or definable target fill level, a request of 120 products per minute is also submitted to the upstream belt.

If, on the other hand, the downstream belt requests 0 products per minute and the current fill level corresponds to the previously defined or definable target fill level (i.e., the fill level has been reached), a request of 0 products per minute is also submitted to the upstream belt and the upstream belt stops immediately.

However, if the downstream belt requests 0 products per minute and the current fill level of the downstream belt does not correspond to the target fill level (i.e., the fill level of the downstream belt has not been reached), a request is submitted to the upstream transport belt until the current fill level of the downstream belt corresponds to the previously defined or definable target fill level. The upstream belt then stops.

In the example embodiment of the packaging line according to the invention shown in FIG. 1, for example, it is accordingly provided that each packaging machine is able to communicate the needed number of products to the upstream transport or conveyor belt. This product request or output request consists of the current number of cycles (i.e., the current machine performance) of the packaging machine plus an offset. The offset can be positive as well as negative and directs the packaging machine to its respective output target.

The packaging machine should register the filling in the infeed area (i.e., the fill level of the infeed conveyor belt). As already mentioned, this can be carried out by the fill level determination on the infeed conveyor belt or also by evaluating a buffer behind the divider. The maximum number of cycles of the packaging machine is limited by the output target determined by the belt control system.

In order to quickly transport the products to the next packaging machine when the transport belts are empty, in the embodiment of the packaging line according to the invention shown schematically in the drawings, the speed of the transport belts is calculated as a function of the fill level of the downstream transport belt. The transport speed is in particular calculated such that pushing of the products at the transfer locations is prevented.

In the design example shown in FIG. 2, for example, the downstream transport belt requests the needed number of products from the front transport belt. The transport speed is calculated from this request and the fill level of the downstream transport belt as shown in the following equation:

$$V = R_{ne} \cdot \frac{l}{Fl_{next}}$$

with:
V=transport speed
$R_{ne}$=output request from the downstream transport or conveyor belt
$Fl_{next}$=fill level of the downstream transport or conveyor belt
l=product length The networking of the packaging line is preferably implemented using Profibus-DP. This means that all data relevant for production is transmitted between the belt control system and the multiple packaging rails via Profibus-DP.

The invention is not limited to the design examples shown in the drawings, but results when all of the features disclosed herein are considered together.

The invention claimed is:

1. A method for operating a packaging line of a packaging installation, wherein the packaging line comprises at least one packaging machine having an infeed conveyor belt, wherein the packaging line further comprises at least one transport belt which, viewed in a transport direction of the packaging line, is disposed upstream of the infeed conveyor belt of the at least one packaging machine and in series with the infeed conveyor belt of the at least one packaging machine, wherein the method comprises the following method steps:

i) determining a current machine performance of the at least one packaging machine, wherein the current machine performance defines the number of products to be processed by the at least one packaging machine per unit of time;

ii) determining an output request for the at least one transport belt, wherein the output request defines a number of products to be delivered to the infeed conveyor belt of the at least one packaging machine by the at least one transport belt per unit of time;

iii) determining a current fill level of the infeed conveyor belt using two light barriers or using a light barrier at a beginning of the infeed conveyor belt, a transport belt speed, and a transport belt length;

iv) setting a transport speed of the at least one transport belt, wherein the transport speed is defined as a function of the determined output request, wherein the packaging line includes a decentralized belt control system based on a pull system which communicates via a bus system the performance requirements against the transport direction of the packaging line from the infeed conveyor belt to the at least one transport belt and from the at least one transport belt to an outfeed conveyor belt of an upstream packaging machine, wherein the belt control system is configured to deliver an output request $R_{ne}$ from the infeed conveyor belt of a downstream packaging machine to the transport belt immediately upstream of the infeed conveyor belt, wherein the output request defines a number of products to be supplied per unit of time to the infeed conveyor belt of the downstream packaging machine by the immediately upstream conveyor belt, wherein the transport speed of the conveyor belt is calculated according to the formula:

$$V = R_{ne} \cdot \frac{l}{Fl_{next}}$$

with:
V=transport speed
$R_{ne}$=output request from the infeed conveyor belt of the at least one packaging machine
$Fl_{next}$=fill level of the infeed conveyor belt of the at least one packaging machine with $0 \leq Fl_{next} \leq 1$
l=product length,
wherein, if the downstream belt requests 0 products per minute and the current fill level of the downstream belt does not correspond to a previously defined target fill level so the target fill level of the downstream belt has not been reached, a request is submitted to the upstream transport belt until the current fill level of the downstream belt corresponds to the target fill level, wherein the upstream belt then stops.

2. The method according to claim 1, wherein the transport speed of the at least one transport belt is defined such that, when products are transferred from the at least one transport belt to the infeed conveyor belt of the at least one packaging machine, pushing of the products on the infeed conveyor belt is prevented.

3. The method according to claim 1, wherein the packaging line comprises a total of n packaging machines connected in series, wherein n is a natural number greater than zero, and wherein a current machine performance of the at least one packaging machine is defined and/or determined as a function of a possible machine performance of each one of the total of n packaging machines.

4. The method according to claim 3, wherein the current machine performance of the at least one packaging machine is furthermore defined and/or determined as a function of a currently possible output of the at least one transport belt.

5. The method according to claim 1, wherein the packaging line comprises at least two packaging machines, which are connected in series and work together and each comprise an infeed conveyor belt and an outfeed conveyor belt, wherein the at least one transport belt is disposed between the outfeed conveyor belt of an upstream packaging machine and the infeed conveyor belt of a downstream packaging machine in series with the packaging machines, wherein the method comprises the following method steps:

i) defining and/or determining a current machine performance of the downstream packaging machine, wherein the current machine performance defines the number of products to be processed by the downstream packaging machine per unit of time; and ii) determining an output request for the at least one transport belt, wherein the output request defines a number of products to be delivered to the infeed conveyor belt of the downstream packaging machine by means of the at least one transport belt per unit of time, wherein the defined and/or determined current machine performance of the downstream packaging machine and optionally a current fill level of the infeed conveyor belt of the downstream packaging machine are taken into consideration when determining the output request for the at least one transport belt.

6. The method according to claim 5, wherein the output request for the at least one transport belt is determined such that the number of products to be delivered to the infeed conveyor belt of the downstream packaging machine per unit of time by the at least one transport belt corresponds to the number of products to be delivered per unit of time which are to be processed by the downstream packaging machine in accordance with the current machine performance and which is necessary to achieve a previously defined or definable filling level of the infeed conveyor belt of the downstream packaging machine.

7. The method according to claim 5, wherein the method further comprises the following optional method step:

iii) determining an output request for the outfeed conveyor belt of the upstream packaging machine, wherein the output request defines a number of products to be delivered to the at least one transport belt per unit of time by means of the outfeed conveyor belt of the upstream packaging machine, wherein the defined and/or determined current machine performance of the downstream packaging machine and a current fill level of the infeed conveyor belt of the downstream packaging machine, and optionally a current fill level of the at least one transport belt, are taken into consideration when determining the output request for the outfeed conveyor belt of the upstream packaging machine.

8. The method according to claim 7, wherein the output request for the outfeed conveyor belt of the upstream packaging machine is determined such that the number of products to be delivered to the at least one transport belt per unit of time by means of the outfeed conveyor belt of the upstream packaging machine corresponds to the number of products to be delivered per unit of time which are to be processed by the downstream packaging machine in accordance with the current machine performance and which is necessary to achieve a previously defined or definable fill level of the infeed conveyor belt of the downstream packaging machine and a previously defined or definable fill level of the at least one transport belt.

\* \* \* \* \*